(12) United States Patent
Ori (10) Patent No.: US 6,515,775 B2
(45) Date of Patent: Feb. 4, 2003

(54) DIFFUSIVE OPTICAL ELEMENT, ILLUMINATION OPTICAL SYSTEM, AND IMAGE-SHOOTING APPARATUS

(75) Inventor: Yuichiro Ori, Moriyama (JP)

(73) Assignee: Minolta Co., Ltd., Osaka (JP)

( * ) Notice: Subject to any disclaimer, the term of this patent is extended or adjusted under 35 U.S.C. 154(b) by 18 days.

(21) Appl. No.: 09/732,207

(22) Filed: Dec. 7, 2000

(65) Prior Publication Data

US 2001/0005317 A1 Jun. 28, 2001

(30) Foreign Application Priority Data

Dec. 22, 1999 (JP) .......................................... 11-363635

(51) Int. Cl.$^7$ ................................................ G03H 1/20
(52) U.S. Cl. ................................. 359/12; 359/1; 359/15; 348/97
(58) Field of Search ................................ 359/1, 12, 15, 359/28; 348/97

(56) References Cited

U.S. PATENT DOCUMENTS

| | | | | |
|---|---|---|---|---|
| 4,602,843 A | * | 7/1986 | Glaser-Inbari | .............. 350/3.7 |
| 4,807,978 A | * | 2/1989 | Grinberg et al. | ........... 350/3.73 |
| 5,046,793 A | | 9/1991 | Hockley et al. | ............... 359/12 |
| 5,847,754 A | | 12/1998 | Thornton | ..................... 348/97 |

* cited by examiner

*Primary Examiner*—Audrey Chang
*Assistant Examiner*—Craig Curtis
(74) *Attorney, Agent, or Firm*—Sidley Austin Brown & Wood LLP (57) ABSTRACT

A diffusive optical element exploiting holography is designed in such a way that, the higher the intensity of incident light in a wavelength range, the lower the rate at which the intensity of diffused light in that wavelength range is reduced with increasing angle relative to the maximum intensity direction. Thus, the lower the intensity of incident light in a wavelength range, the narrower the range of angles at which light is diffused in that wavelength range. This makes it possible to use light diffused at angles within a predetermined range relative to the maximum intensity direction, and thereby enhance light use efficiency in a wavelength range in which light intensity is comparatively low. This diffusive optical element is employed in an illumination optical system, which is used to illuminate photographic film from which to read images.

23 Claims, 5 Drawing Sheets

FIG.10 PRIOR ART

DIFFUSIVE OPTICAL ELEMENT, ILLUMINATION OPTICAL SYSTEM, AND IMAGE-SHOOTING APPARATUS

This application is based on application Ser. No. H11-363635 filed in Japan on Dec. 22, 1999, the entire contents of which are hereby incorporated by reference.

BACKGROUND OF THE INVENTION

1. Field of the Invention

The present invention relates to a diffusive optical element, an illumination optical system, and an image-shooting apparatus such as a film-reading apparatus.

2. Description of the Prior Art

A film-reading apparatus (film scanner) for reading images recorded on photographic film is provided with an illumination optical system for illuminating the film, a taking lens for imaging the illumination light transmitted through the film, and an image-sensing device for shooting images by receiving the light exiting from the taking lens. The film is disposed on the illumination target plane of the illumination optical system, and the image-sensing device is disposed on the imaging plane of the taking lens that lies conjugate with the illumination target plane.

In a high-performance film-reading apparatus, uniform illumination is essential, and therefore, to make the uneven intensity distribution of a light beam emitted from a light source uniform on the illumination target plane, a Köhler illumination optical system provided with an integrator is used. As the integrator, a lens array or rod is used, either of which functions basically in the same manner. Specifically, the light beam from the light source is split into a plurality of light beams, which are then imaged as secondary light-source images in the vicinity of an aperture stop of the taking lens so that the thus split light beams are superimposed on one another on the illumination target plane. This permits every portion on the film to receive all of the split light beams, which makes it possible to realize highly uniform illumination.

From the perspective of efficient use of light, it is preferable to illuminate the film with illumination light that has made into a reasonably parallel beam. However, in a film-reading apparatus, if the film is illuminated with a parallel beam, a scratch or foreign particle, if any, present on the film appears distinctly in the image shot, i.e. read, by the image-sensing device. This can be avoided by disposing a diffusive optical element in the vicinity of the film so that the film is illuminated with illumination light that has a uniform intensity distribution but is nevertheless diffusive.

The more the illumination light is diffused, the more effectively it is possible to reduce the effect on the image shot of a scratch or the like present on the film. For this reason, the diffusive optical element is generally designed to diffuse light in such a way that part of the diffused light reaches outside the area determined by the entrance-side numerical aperture of the taking lens.

A film-reading apparatus employs a light source that emits white light. In general, the intensity of the light emitted from a light source varies greatly from one wavelength range to another. For example, with a halogen lamp, the ratio of the intensity of light it emits in red, green, and blue wavelength ranges is about 10:4:1. Therefore, if the light from such a light source is used intact as illumination light, it is impossible to reproduce correctly the colors of images recorded on film.

This can be overcome by disposing, somewhere in the optical path from the light source to the image-sensing device, a filter that transmits only part of light in a wavelength range in which light intensity is comparatively high so that, in each wavelength range, an amount of light equal to that in the wavelength range in which light intensity is lowest reaches the image-sensing device. For example, with light having an intensity ratio as mentioned above, it is possible to make the amounts of light in individual wavelength ranges uniform by discarding 90% of red light and 75% of green light.

While diffusing illumination light wide is effective in reducing the effect of a scratch or the like present on the film, it simultaneously reduces light use efficiency. In particular when a common diffusion plate formed of frosted glass or of microparticles is used as the diffusive optical element, since such a diffusion plate diffuses light nearly on a perfect-diffusion basis, i.e. in such a way that the intensity of the diffused light is proportional to the cosine of the angle thereof relative to the direction normal to the diffusion plate, while the effect of a scratch or the like present on the film is reduced further, light use efficiency lowers further.

Moreover, a conventional diffusive optical element does not exhibit wavelength dependence, and thus diffuses light of different wavelengths to approximately identical degrees. Therefore, the proportion of light lost through diffusion is constant in all wavelength ranges irrespective of whether light intensity is high or low therein.

Figure 9:
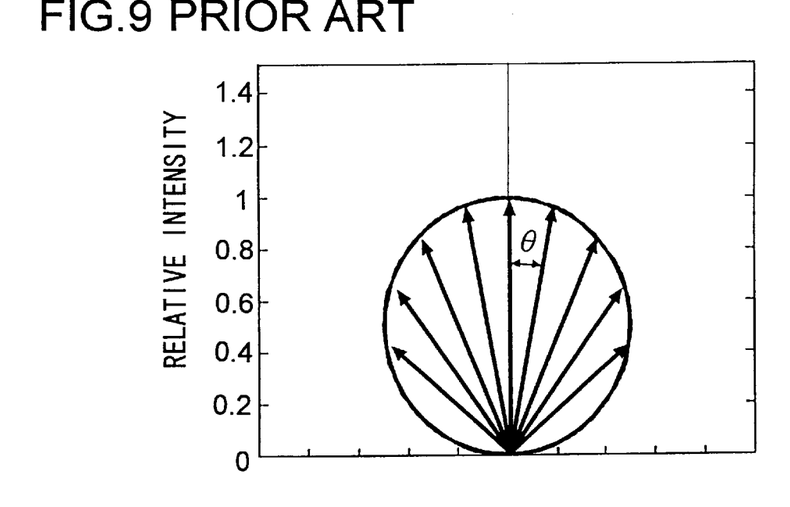
FIG. 9 is a diagram showing the diffusion characteristic of a perfect-diffusion surface, as plotted in a polar coordinate system.
Figure 10:
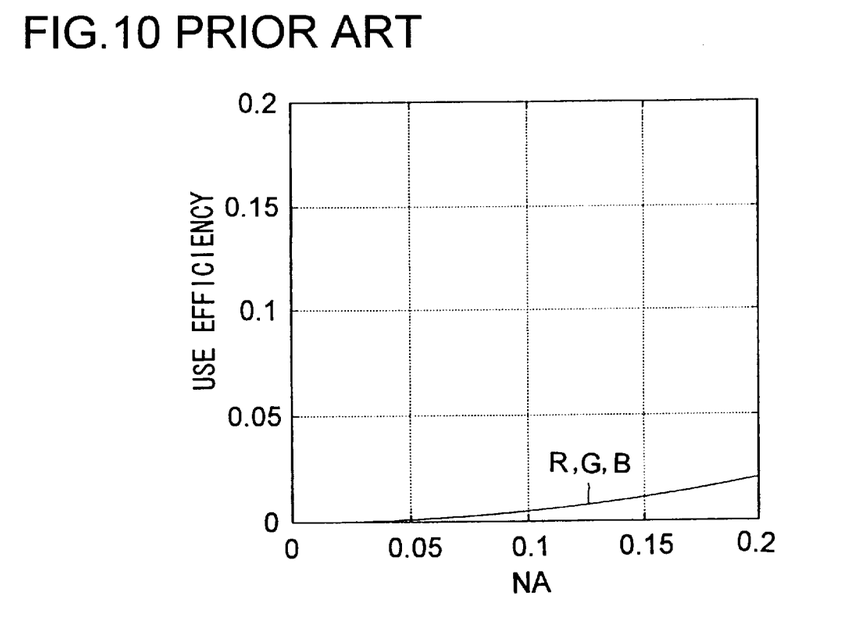
FIG. 10 is a diagram showing the relationship between the entrance-side numerical aperture of the taking lens and the efficiency of use of the light from the light source in a conventional film-reading apparatus.

FIG. 9 shows the diffusion characteristic of a perfect-diffusion surface as plotted in a polar coordinate system, and FIG. 10 shows the efficiency with which the light from a light source is used in a conventional film-reading apparatus employing a perfect-diffusion surface. As shown in FIG. 10, within a range in which the numerical aperture NA of the taking lens has practical values of 0.2 or less, light use efficiency is about 2% or less.

Low light use efficiency imposes severe restrictions on enhancement of the image-reading performance of a film-reading apparatus. In particular in a scanning-type apparatus that is provided with a line sensor as an image-sensing device and that reads an image line by line, low light use efficiency makes high-speed scanning impossible, and thus imposes a rigid limit on image-reading speed. It is of course possible to enhance image-reading performance to a certain degree by increasing the output of the light source, but doing so leads to higher electric power consumption, and in addition shortens the operating life of the light source.

SUMMARY OF THE INVENTION

An object of the present invention is to provide an image-shooting apparatus that excels in light use efficiency, and to provide a diffusive optical element and an illumination optical system suitable for use in such an optical apparatus.

To achieve the above object, according to one aspect of the present invention, a diffusive optical element is designed to diffuse light in such a way that light incident thereon from a predetermined direction is diffused so as to exhibit the maximum intensity in an identical direction irrespective of wavelength and that, the lower the intensity of incident light in a wavelength range, the higher the rate at which the intensity of diffused light in that wavelength range is reduced with increasing angle relative to the maximum intensity direction.

This diffusive optical element diffuses light in such a way that light incident thereon from a predetermined direction is diffused so as to exhibit, after diffusion, the maximum intensity in an identical direction irrespective of wavelength. In addition, light of different wavelength ranges is diffused in such a way that, the lower the intensity of incident light in a wavelength range, the higher the rate at which the intensity of diffused light in that wavelength is reduced with increasing angle relative to the maximum intensity direction. That is, the lower the intensity of incident light in a wavelength range, the narrower the range of angles at which light is diffused in that wavelength range. Accordingly, by using diffused light of different wavelength ranges within an identical range of angles relative to the maximum intensity direction, it is possible to use light of a wavelength range in which light intensity is low (hereinafter called a low-intensity wavelength range) with high light use efficiency and use light of a wavelength range in which light intensity is high (hereinafter called a high-intensity wavelength range) with low light use efficiency.

For example, in cases where, as in a film-reading apparatus, part of light of a high-intensity wavelength range needs to be discarded to make the amount thereof equal to the amount of light of a low-intensity wavelength range, enhancing light use efficiency in a low-intensity wavelength range by the use of the diffusive optical element results in enhancing light use efficiency in all wavelength ranges. On the other hand, reducing light use efficiency in a high-intensity wavelength range by the use of the diffusive optical element has no effect on light use efficiency in all wavelength ranges.

The diffusive optical element may have the shape of a flat plate. In that case, setting the maximum intensity direction to be normal to the diffusive optical element makes it easy to place the element in a desired arrangement relative to another optical element that receives the diffused light. The diffusive optical element can easily be produced as a hologram element.

The rate at which the intensity of the diffused light is reduced with increasing angle relative to the maximum intensity direction may be set separately for light of three wavelength ranges corresponding to red, green, and blue regions of a light spectrum. This makes the element suitable to diffuse white light but nevertheless, by limiting the number of divided wavelength ranges to a small number, it is possible to keep it easy to produce.

According to another aspect of the present invention, an illumination optical system is provided with: a light source that radiates light of wavelengths corresponding to red to blue regions of a light spectrum; an integrator that directs the light radiated from the light source toward a predetermined illumination target plane as a light beam having a uniform intensity distribution; and a diffusive optical element as described above. Here, the diffusive optical element has the rate at which the intensity of the diffused light is reduced with increasing angle relative to the maximum intensity direction set separately for light of a plurality of different wavelength ranges, and the diffusive optical element is disposed in the optical path from the integrator to the illumination target plane in such a way that the light beam exiting from the integrator is incident on the diffusive optical element from the predetermined direction and that the maximum intensity direction is perpendicular to the illumination target plane.

This illumination optical system illuminates the illumination target plane uniformly with diffused white light. The diffusive optical element used here diffuses light, as described above, in such a way that, the lower the intensity of incident light in a wavelength range, the higher the rate at which the intensity of diffused light in that wavelength range is reduced with increasing angle relative to the maximum intensity direction. Thus, the illumination optical system offers high light use efficiency in a low-intensity wavelength range. The diffusive optical element is arranged in such a way that the maximum intensity direction is perpendicular to the illumination target plane, and therefore every point on the illumination target plane receives light with an intensity distribution pattern symmetric with respect to the normal to the illumination target plane through that point.

According to still another aspect of the present invention, an image-shooting apparatus is provided with: an illumination optical system as described above; a taking lens that has an optical axis arranged perpendicularly to the illumination target plane and that images the light beam exiting from the diffusive optical element and transmitted through a subject placed on the illumination target plane onto a predetermined imaging plane; an image-sensing device that is disposed on the imaging plane and that shoots the subject by receiving the light beam exiting from the taking lens; and a light adjuster that adjusts brightness of light differently in different wavelength ranges based on the rates at which the intensity of the diffused light is reduced with increasing angle relative to the maximum brightness direction in the individual wavelength ranges and based on the entrance-side numerical aperture of the taking lens in such a way that the image-sensing device receives light having substantially identical power in the plurality of wavelength ranges.

This image-shooting apparatus shoots as a subject a planar object that transmits light, such as photographic film. The subject is placed on the illumination target plane, and every portion thereof is illuminated uniformly with diffused white light. Of the light emitted from the light source, light in a low intensity wavelength range is incident on the subject at incident angles within a comparatively narrow range, and light in a high-intensity wavelength range is incident thereon at incident angles within a comparatively wide range. Thus, more light enters the taking lens in a low-intensity wavelength range than in a high-intensity wavelength range, which enhances light use efficiency. A scratch or foreign particle present on the subject deflects the path of the illumination light and thereby reduces the amount of light that enters the taking lens from that spot. However, since light in a high-intensity wavelength range is incident on the subject at incident angles within a wide range, even if its path is deflected by a scratch or foreign particle, the greater part thereof enters the taking lens. This helps prevent a scratch or the like present on the subject from appearing distinctly in the image shot by the image-sensing device.

The light adjuster adjusts the brightness of light differently in different wavelength ranges in such a way that the image-sensing device receives light having equal power in a plurality of wavelength ranges. This adjustment is performed based on the rates at which the intensity of the diffused light is reduced with increasing angle relative to the maximum brightness direction in the individual wavelength ranges and based on the entrance-side numerical aperture of the taking lens. As a result of this brightness adjustment, the unnecessary portion of light of a high-intensity wavelength range is discarded, which makes insignificant the fact that the diffusive optical element exhibits lower light use efficiency in a high-intensity wavelength range than in a low-intensity wavelength range. The light adjuster may be disposed anywhere in the optical path from the light source within the illumination optical system to the image-sensing device.

The image-shooting apparatus described above may be so configured as to have a flat-plate-shaped diffusive optical element arranged parallel to the illumination target plane and in addition fulfill expression (1) below.

$$1/[2 \tan(\theta_{NA})] \leq L \leq D_F/[2 \tan(2\theta_{NA})] \quad (1)$$

where L represents the distance from the diffusive optical element to the illumination target plane, $D_F$ represents the effective diameter of the subject, and $\theta_{NA}$ represents the arcsine of the entrance-side numerical aperture of the taking lens.

Expression (1) defines the permissible range of the distance from the diffusive optical element to the illumination target plane in terms of the effective diameter of the subject and the entrance-side numerical aperture of the taking lens. If the distance from the diffusive optical element to the illumination target plane is longer than the upper limit defined by expression (1), light use efficiency tends to be low; by contrast, if the distance is shorter than the lower limit defined by expression (1), a foreign particle, if any, present on the diffusive optical element tends to appear distinctly in the image shot.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
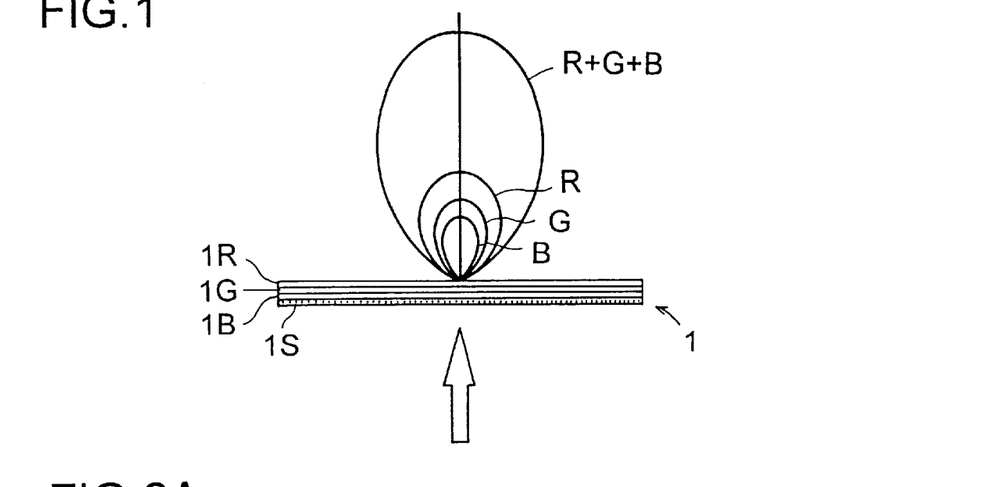
FIG. 1 is a diagram schematically showing the structure of the diffusive optical element of a first embodiment of the invention and the relationship between incident and diffused light.

Hereinafter, embodiments of the present invention will be described with reference to the drawings. FIG. 1 schematically shows the structure of the diffusive optical element 1 of a first embodiment of the invention and the relationship between incident and diffused light. The diffusive optical element 1 is built as a transmissive hologram diffusion plate composed of three volume hologram layers 1R, 1G, and 1B laid over a flat-plate-shaped transparent substrate 1S. The diffusive optical element 1 diffuses white light containing light of all wavelengths ranging from red to blue regions of the light spectrum, and a light beam incident on the diffusive optical element 1 from the direction normal thereto (indicated by arrows in the figure) is diffused in such a way that the light diffused by the diffusive optical element 1, i.e. the light transmitted therethrough, exhibits the maximum intensity in the direction normal thereto irrespective of wavelength.

The diffusive optical element 1 diffuses light nearly on a perfect-diffusion basis in terms of the integral over the entire spectrum of white light, but the rate at which the intensity of the diffused light is reduced with increasing angle relative to the normal direction, i.e. the maximum intensity direction, is set differently for light of red (R), green (G), and blue (B) wavelength ranges. Specifically, here, considering that the intensity of white light emitted from a light source is generally highest in the red wavelength range and lowest in the blue wavelength range, the intensity reduction rate is set to be low in the red wavelength range, medium in the green wavelength range, and high in the blue wavelength range.

The diffusion of light of the red, green, and blue wavelength ranges is achieved by the hologram layers 1R, 1G, and 1B respectively. The individual layers are produced by exposing, under different conditions, materials that are sensitive selectively to light of the red, green, and blue wavelength ranges. The hologram layers 1R, 1G, and 1B may be laid over one another in any order.

Figure 2A:
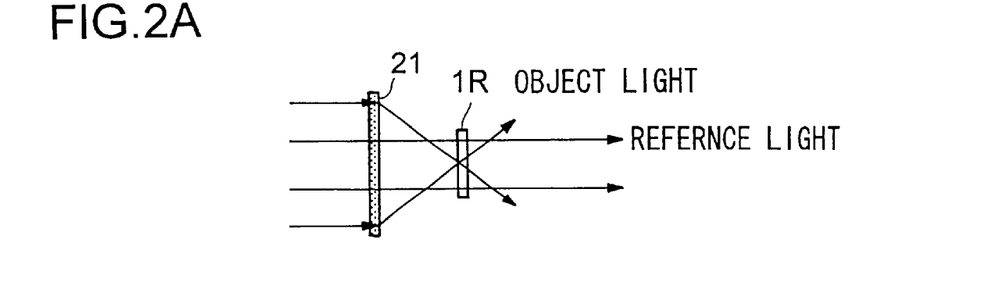
FIGS. 2A, 2B, and 2C are diagrams schematically showing the hologram exposure method used in the production of the diffusive optical element.
Figure 2B:
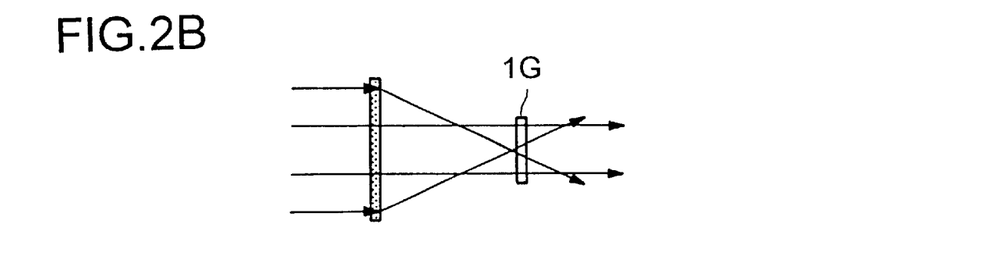
Figure 2C:
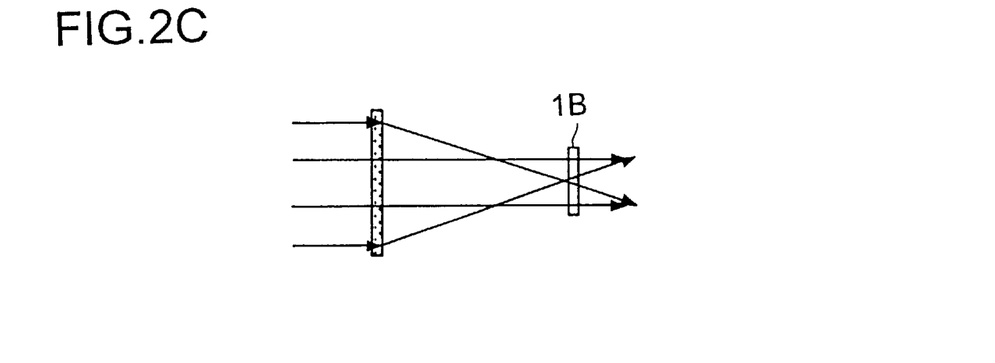

FIGS. 2A, 2B, and 2C schematically show the hologram exposure method used in the production of the diffusive optical element 1. The diffusive optical element 1 is of an on-axis type, and object light diffused by a diffusion plate 21 and reference light traveling straight is shone thereon from the same direction. FIGS. 2A, 2B, and 2C respectively show how the hologram layers 1R, 1G, and 1B are exposed. Light of the red, green, and blue wavelength ranges is used as both object light and reference light to expose the hologram layers 1R, 1G, and 1B respectively. The diffusion characteristic of the individual hologram layers 1R, 1G, and 1B can be set differently by appropriately setting the external size and particle size of the diffusion plate 21 and the distance from the diffusion plate 21 to the hologram layers 1R, 1G, and 1B.

Specifically, the diffusion characteristic of the diffusive optical element 1 is set in such a way that the relation between the angle θ relative to the normal direction and the intensity I of the diffused light largely fulfills expressions (2) to (5) below.

$$I_R(\theta) = I_R(0)\cos^2(\theta) \quad (2)$$

$$I_G(\theta) = I_G(0)\cos^4(\theta) \quad (3)$$

$$I_B(\theta) = I_B(0)\cos^6(\theta) \quad (4)$$

$$I_W(\theta) = I_R(\theta) + I_G(\theta) + I_B(\theta) \quad (5)$$

Figure 3:
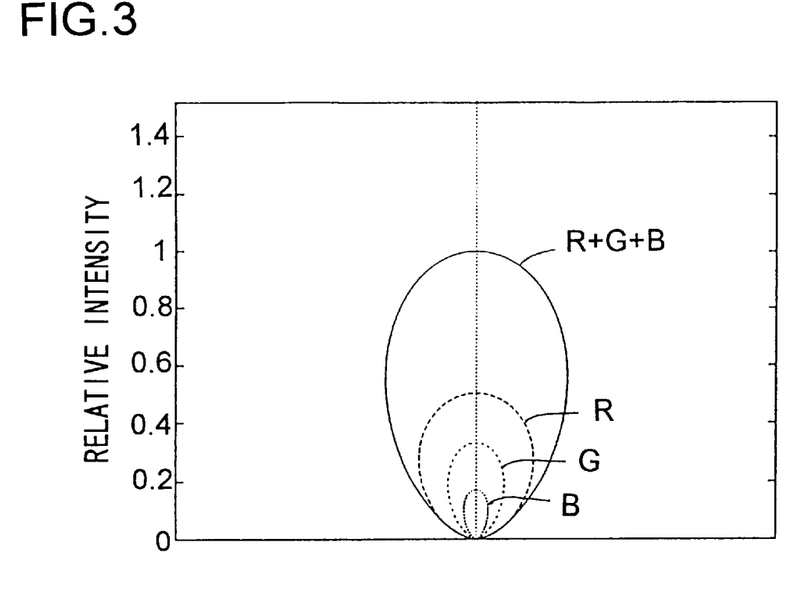
FIG. 3 is a diagram showing the diffusion characteristic, as plotted in a polar coordinate system, of the diffusive optical element.

Here, the subscripts R, G, and B indicate that the variables to which they are attached represent the intensity of light of the red, green, and blue wavelength ranges respectively, and the subscript W indicates that the variable to which it is attached represents the intensity of white light over the entire spectrum thereof. Moreover, I (0) represents the intensity in the direction in which θ=0, i.e. the maximum intensity. Hereinafter, a similar notation will be used also with brightness L and illuminance E.

Where expressions (2) to (4) are fulfilled, the higher the degree of the consine in the expressions, the narrower the range of angles at which light is diffused. For example, the angle at which 25% of the maximum intensity is obtained is 60° in the red wavelength range, 45° in the green wavelength range, and 37.5° in the blue wavelength range. When the ratio $I_R(0):I_G(0):I_B(0)$ of the maximum intensity of light in the red, green, and blue wavelength ranges is set to be 0.47:0.33:0.20 ($I_W(0)=1$), then the diffusive optical element 1 exhibits a diffusion characteristic as shown in FIG. 3, if plotted in a polar coordinate system.

The brightness $L_R$, $L_G$, and $L_B$, in the individual wavelength ranges, of the light diffused by the diffusive optical element 1 is given by expressions (6) to (8) below based on the generally known relation between brightness and intensity, and depends on the angle relative to the maximum intensity direction. The brightness of white light $L_w$ over the entire spectrum thereof is given by expression (9) below.

$$L_R(\theta)=L_R(0)\cos(\theta) \qquad (6)$$

$$L_G(\theta)=L_G(0)\cos^3(\theta) \qquad (7)$$

$$L_B(\theta)=L_B(0)\cos^5(\theta) \qquad (8)$$

$$L_W(\theta)=L_R(\theta)+L_G(\theta)+L_B(\theta) \qquad (9)$$

In this way, the diffusive optical element 1 exhibits different diffusion characteristics in different wavelength ranges, and in addition diffuses white light incident thereon in such a way that, the lower the intensity of light in a wavelength range, the narrower the range of angles at which light in that wavelength range is diffused. Thus, by using the diffused light within a predetermined range of angles relative to the normal direction, i.e. the maximum intensity direction, it is possible to use light of the blue wavelength range, in which light intensity is lowest, with the highest light use efficiency and use light of the green wavelength range, in which light intensity is second lowest, with high light use efficiency. In this case, the light use efficiency in the red wavelength range, in which light intensity is highest, is lower than in the other two wavelength ranges, but this is insignificant in applications where it is essential to discard unnecessary light.

In this embodiment, the diffusive optical element 1 incorporates three hologram layers 1R, 1G, and 1B; however, it may incorporate a single hologram layer that exhibits different diffusion characteristics in different wavelength ranges. In that case, the single layer is produced through multiple exposure, under varying conditions, of a material sensitive to the entire spectrum of white light.

Figure 4:
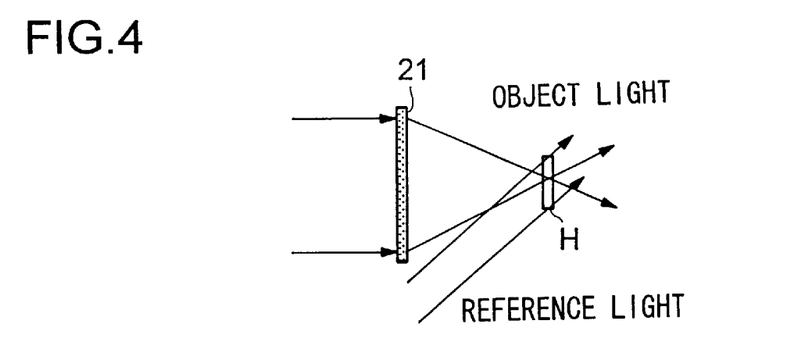
FIG. 4 is a diagram schematically showing the hologram exposure method used in the production of a modified version of the diffusive optical element.

Moreover, although the diffusive optical element 1 here is built as an on-axis type, it may be built as an off-axis type. FIG. 4 schematically shows the hologram exposure method in the production of the diffusive optical element when it is built as an off-axis type. In this case, reference light is shone on the diffusive optical element from a direction different from object light diffused by a diffusion plate 21.

Although not illustrated, as described previously, by appropriately setting the external size and particle size of the diffusion plate 21 for diffusing the object light and the distance from the diffusion plate 21 to the hologram layer H, it is possible to make the diffusive optical element exhibit different diffusion characteristics in different wavelength ranges. Also in this case, the diffusive optical element may incorporate a plurality of hologram layers one for each of different wavelength ranges, or may instead incorporate a single hologram layer exhibiting different diffusion characteristics.

When an off-axis type diffusive optical element is used singly, by shining the light beam to be diffused thereon from the same direction as the reference light used for its exposure, it is possible to obtain the maximum intensity in the normal direction. When an off-axis type diffusive optical element is used in combination with a deflecting element, it is possible to shine the light beam to be diffused thereon from the normal direction, just as with an on-axis type diffusive optical element.

Figure 5:
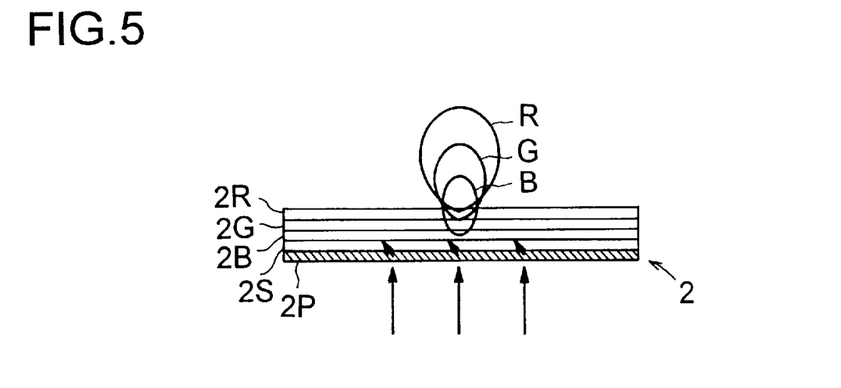
FIG. 5 is a diagram schematically showing the structure of the modified version of the diffusive optical element, when used in combination with a deflecting element, and the relationship between incident and diffused light.

FIG. 5 shows an example of an off-axis type diffusive optical element used in combination with a deflecting element. This diffusive optical element 2 is composed of a substrate 2S, three hologram layers 2R, 2G, and 2B laid over one another on the top surface of the substrate 2S, and a deflecting element 2P bonded to the bottom surface of the substrate 2S. The deflecting element 2P is, for example, a diffraction grating, and is designed to permit light coming from the normal direction to enter the hologram layers 2R, 2G, and 2B from the same direction as the reference light used for their exposure. Thus, the light diffused by the diffusive optical element 2 has the maximum intensity in the normal direction.

In all the examples described thus far, the maximum intensity direction is set to be identical with the normal direction; however, the maximum intensity direction may be any other direction. In fact, the maximum intensity direction can easily be set by appropriately setting the direction from which object light is shone on the hologram layers when they are exposed. Moreover, although the diffusive optical elements 1 and 2 are both built as a transmissive type hologram diffusion plate, they may be built as a reflective type hologram diffusion plate. A reflective type hologram diffusion plate is obtained by shining object light on a material to be made into a hologram layer from the direction facing one surface thereof and shining reference light thereon from the direction facing the opposite surface thereof.

Figure 6:
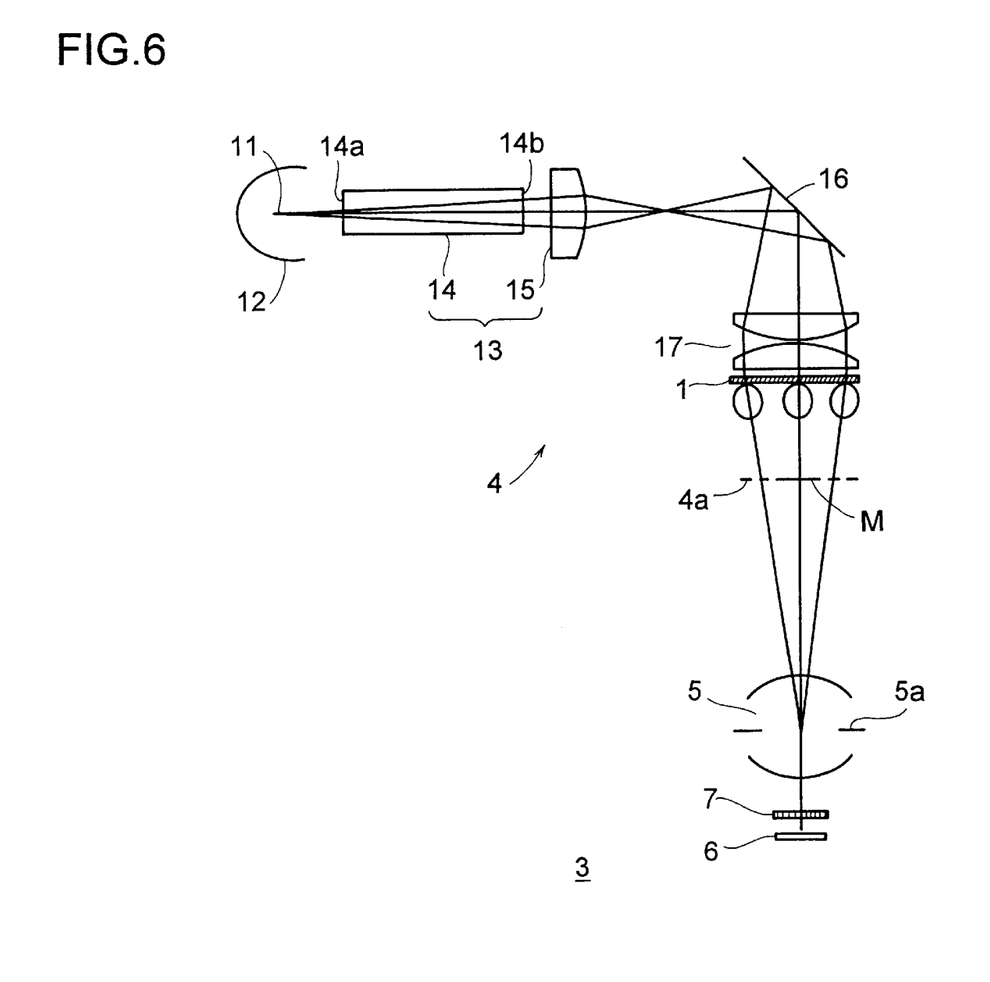
FIG. 6 is a diagram showing the outline of the construction of the film reading apparatus of a second embodiment of the invention.

FIG. 6 shows the outline of the construction of the film-reading apparatus 3 of a second embodiment of the invention. The film-reading apparatus 3 is provided with an illumination optical system 4, a taking lens 5, a charge-coupled device (CCD) 6 serving as an image-sensing device, and a filter 7. Film M from which to read images is disposed on the illumination target plane 4a of the illumination optical system 4.

The illumination optical system 4 is composed of a light source 11, a reflector 12, an integrator 13, a total-reflection mirror 16, a collimator lens 17, and a diffusive optical element 1. The light source 11 is a lamp that emits white light, such as a halogen lamp. The reflector 12 has a reflective surface having the shape of an ellipsoid of revolution, at the first focus of which the light source 11 is disposed.

The integrator 13 is composed of a rod 14 having the shape of a rectangular prism and a condenser lens 15. The rod 14 has one end surface 14a thereof located in the vicinity of the second focus of the reflector 12, and has the inner sides of the side surfaces thereof formed into total-reflection surfaces. The light emitted from the light source 11 is reflected from the reflector 12 and is thereby formed into a convergent beam that converges at the end surface 14a. The light thus enters the rod 14, is then reflected from the side surfaces a number of times according to the incident angle at which it struck the end surface 14a, and then exits from the rod 14 through the other end surface 14b thereof. This splits the light beam from the light source 11. The light beams split by the rod 14 are individually imaged by the condenser lens 15 in the vicinity of an aperture stop 5a of the taking lens 5. Thus, the split light beams are superimposed on one another on the illumination target plane 4a of the illumination optical system 4. In this way, the illumination target plane 4a is illuminated uniformly.

The total-reflection mirror 16 turns the optical path and thereby serves to make the film-reading apparatus 3 compact as a whole. The collimator lens 17 forms the light from the integrator 13 into a substantially parallel beam and directs it to the diffusive optical element 1.

The diffusive optical element 1 here is the one described previously as the first embodiment, and is arranged with the direction of its normal perpendicular to the illumination target plane 4a. The taking lens 5 is arranged perpendicularly to the illumination target plane 4a so that its optical axis passes through the center of the film M. The taking lens 5 is designed to be telecentric both on the entrance and exit sides thereof.

The CCD 6 is disposed on the imaging plane of the taking lens 5 that lies conjugate with the illumination target plane 4a, and shoots an image recorded on the film M by receiving the light exiting from the illumination optical system 4 and transmitted through the film M. The CCD 6 is of a scanning type built as a line sensor that reads an image by shooting one line after another thereof while moving perpendicularly to the direction in which its pixels are arranged. The taking lens 5 may be divided into a front unit located in front of the aperture stop 5a and a rear unit located behind it, with a rotating mirror disposed in the vicinity of the aperture stop 5a, so that scanning is achieved by the rotation of the mirror. Alternatively, the CCD 6 may be an area sensor that reads a whole image at once.

The filter 7 is disposed immediately in front of the CCD 6, and is designed to transmit all light in the blue wavelength range and transmit part of light in the red and green wavelength ranges. The filter 7 exhibits different transmittances in the red and green wavelength ranges; specifically, it exhibits a higher transmittance in the green wavelength range than in the red wavelength range.

The illuminance E, i.e. the power of light per unit area, on the imaging plane on which the CCD 6 is disposed is equal to the integral of the brightness L over the solid angle determined by the f/number of the taking lens 5, and is thus given by expression (10) below.

$$E = 2\pi \int [L(\theta')\sin(\theta')\cos(\theta')] d\theta' \quad (10)$$

Here, the interval of the definite integral is from 0 to the arcsine of the entrance-side numerical aperture NA of the taking lens 5. That is, if the entrance-side numerical aperture NA of the taking lens 5 is expressed as $\sin(\theta_{NA})$, then the upper limit of the interval of the definite integral is $\theta_{NA}$.

As described previously, the brightness of light in the red, green, and blue wavelength ranges is given by expressions (6) to (8). Thus, by substituting those expressions in expression (10), the illuminance $E_R$, $E_G$, and $E_B$ in the individual wavelength ranges is given by expression (11) to (13) below. The brightness $E_W$ of white light over the entire spectrum thereof is given by expression (14).

$$E_R = 2\pi L_R(0)[1-\cos^3(\theta_{NA})]/2 \quad (11)$$

$$E_G = 2\pi L_G(0)[1-\cos^5(\theta_{NA})]/3 \quad (12)$$

$$E_B = 2\pi L_B(0)[1-\cos^7(\theta_{NA})]/4 \quad (13)$$

$$E_W = E_R + E_G + E_B \quad (14)$$

Without the filter 7, the proportion of the power of the diffused light that enters the taking lens 5 and reaches the CCD 6 is equal to the ratio of the illuminance given by expressions (11) to (13) to the illuminance calculated as the definite integral given by expression (10) using $\pi/2$ as the upper limit, and thus differs from one wavelength range to another. The transmittances of the filter 7 in the red and green wavelength ranges are determined on the basis of expressions (11) to (13) in such a way that the illuminance $E_R$, $E_G$, and $E_B$ in the red, green, and blue wavelength ranges is equal on the CCD 6. This makes it possible for the CCD 6 to shoot images that correctly reproduce the colors of images recorded on the film M. As a matter of course, the filter 7 may be disposed anywhere in the optical path from the light source 11 to the CCD 6.

In the film-reading apparatus 3, the entrance-side numerical aperture NA of the taking lens 5 is set to be 0.1 (equivalent to an f/number of f/5), and thus the ratio $E_R:E_G:E_B$ of the illuminance given by expressions (11) to (13) is 1:1.7:2.3. That is, as compared with a conventional diffusive optical element in which the intensity of diffused light is reduced at an identical rate with increasing angle relative to the maximum intensity direction irrespective of wavelength, here the light use efficiency in the green and blue wavelength ranges is close to twice as high and more than twice as high respectively.

Figure 7:
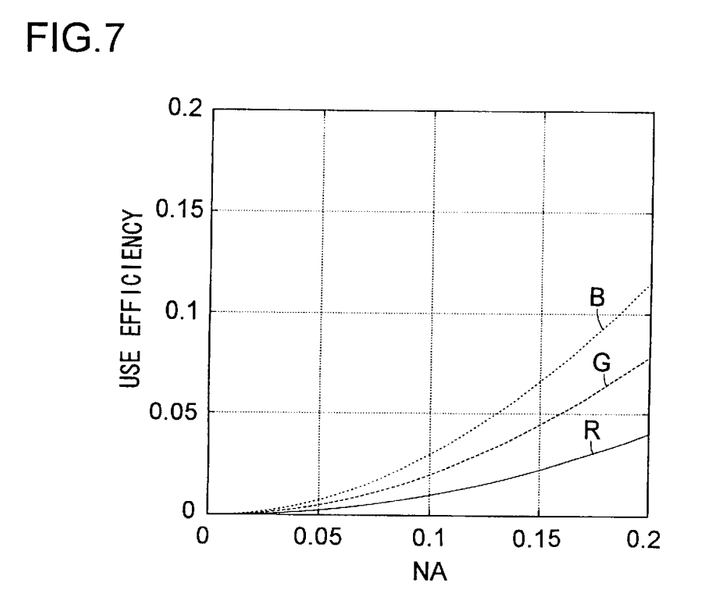
FIG. 7 is a diagram showing the relationship between the entrance-side numerical aperture of the taking lens and the efficiency of use of the light from the light source in the film-reading apparatus.

Moreover, this ratio of illuminance is constant within the range in which the entrance-side numerical aperture NA of the taking lens 5 has practical values of 0.2 or less. FIG. 7 shows the relationship between the entrance-side numerical aperture NA of the taking lens 5 and the efficiency of use of the light from the light source 11. In the film-reading apparatus 3, the diffusive optical element 1 is designed to diffuse even light of the red wavelength range at angles within a range narrower than when it is diffused on a perfect-diffusion basis (see expression (2)). Thus, as will be clear by comparing FIG. 7 with FIG. 10, it is possible to achieve even higher light use efficiency over the entire spectrum of white light.

The diffusion characteristic of the diffusive optical element 1 shown in FIG. 3 described previously aims to realize the ratio of illuminance noted above, and is thus equivalent to disposing the filter 7 in the optical path from the light source 11 to the diffusive optical element 1.

Light striking a scratch or foreign particle present on the film M does not travel straight but has its path deflected according to the shape of the scratch or foreign particle. Therefore, of the light traveling from the diffusive, optical element 1 to the taking lens 5, portions having passed through portions of the film where a scratch or the like is present is less likely to enter the taking lens 5. However, the light from the diffusive optical element 1 includes also portions that do not enter the taking lens 5 if they travel straight, and part of such portions of the light have their path deflected by portions of the film M where a scratch or the like is present so as to enter the taking lens 5. That is, light that, if it travels straight, is supposed to enter the taking lens 5 but that is eventually lost by a scratch or the like is compensated for by light that is not originally supposed to enter the taking lens 5. This prevents a scratch or the like present on the film M from appearing distinctly in the image shot.

Figure 8:
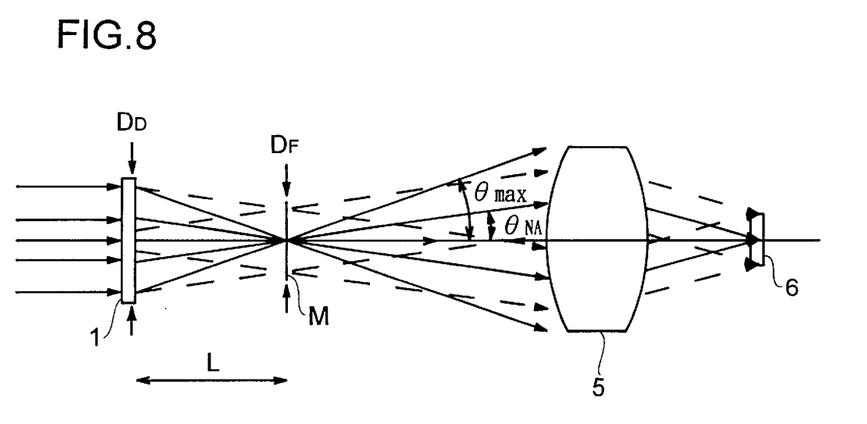
FIG. 8 is a diagram showing the relationship between the effective diameter of the diffusive optical element, the effective diameter of the film, and the distance from the diffusive optical element to the illumination target plane.

The wider the range of incident angles at which light strikes the film M, the higher this effect is. And the range of incident angles at which light strikes the film M depends on the effective diameter of the diffusive optical element 1, the effective diameter of the film M, and the distance from the diffusive optical element 1 to the film M (i.e. to the illumination target plane 4a). FIG. 8 shows the relationship between the effective diameter $D_D$ of the diffusive optical element 1, the effective diameter $D_F$ of the film M, and the distance L from the diffusive optical element 1 to the illumination target plane 4a.

Now, suppose that light from the diffusive optical element 1 within the range of angles θ up to $θ_{max}$ relative to the maximum intensity direction (normal direction) passes through some portion of the film M. Then, the necessary and sufficient condition to be fulfilled by the effective diameter $D_D$ of the diffusive optical element 1 is given by expression (15) below.

$$D_D = D_F + 2L \tan(θ_{max}) \quad (15)$$

If the effective diameter $D_D$ of the diffusive optical element 1 is smaller than the right side of expression (15), too little light passes through the peripheral portion of the film M, and thus uniform illumination is impossible. By contrast, if the effective diameter $D_D$ is greater than the right side of expression (15), light from the peripheral portion of the diffusive optical element 1 does not strike the film, and thus the diffusive optical element 1 needs to be made unduly large.

Through simulation performed to determine the maximum angle $θ_{max}$ required to effectively reduce the effect of a scratch or the like present in the film M, it was found that the maximum angle $θ_{max}$ needs to fulfill the relation given by expression (16) below with the entrance-side numerical aperture NA (=$\sin(θ_{NA})$) of the taking lens 5.

$$θ_{max} ≥ 4 θ_{NA} \quad (16)$$

However, even when expression (16) is fulfilled, increasing the distance L from the diffusive optical element 1 to the illumination target plane 4a leads to increasing the effective diameter $D_D$ required of the diffusive optical element 1, and thus to making the illumination optical system 4 larger. Moreover, increasing the maximum angle $θ_{max}$ too much leads to increasing the proportion of the light from the peripheral portion of the diffusive optical element 1 that does not strike the film M, and thus to lowering light use efficiency. Accordingly, it is preferable to keep the effective diameter $D_D$ of the diffusive optical element 1 smaller than about twice the effective diameter $D_F$ of the film M and keep the maximum angle $θ_{max}$ in the vicinity of the lower limit of expression (16). Specifically, fulfilling expression (17) below makes it possible to reduce the effect of a scratch or the like present on the film M satisfactorily without making the illumination optical system 4 larger or lowering light use efficiency.

$$D_F + 2L \tan(2θ_{NA}) ≤ 2D_F \quad (17)$$

Another way to increase the maximum angle $θ_{max}$ is to shorten the distance L from the diffusive optical element 1 to the illumination target plane 4a. However, since the illumination target plane is conjugate with the imaging plane, shortening the distance L too much causes a foreign particle, if any, on the diffusive optical element 1 to appear distinctly in the image shot. This can be avoided by making light from a single point on the diffusive optical element 1 diverge so as to have a beam width of 1 mm or greater on the film M before entering the taking lens 5. This can be achieved by fulfilling expression (18) below $$L ≥ 1/2\tan(θ_{NA}) \quad (18)$$

Combining expressions (17) and (18) yields expression (1) noted earlier.

$$1/[2 \tan(θ_{NA})] ≤ L ≤ D_F/[2 \tan(2 θ_{NA})] \quad (1)$$

Specifically, substituting $D_F$=35 mm and NA=0.1 yields expression (19) below.

$$5 \text{ (mm)} ≤ L ≤ 86 \text{ (mm)} \quad (19)$$

Under these conditions, the necessary and sufficient effective diameter $D_D$ of the diffusive optical element 1 as calculated according to expression (15) is $D_B$=36 (mm) at the lower limit L=5 (mm), $D_D$=52 (mm) at the upper limit L=86 (mm), and $D_D$=45 (mm) at the middle L=50 (mm).

As described previously, the diffusive optical element 1 is designed to reduce the intensity of diffused light with increasing angle relative to the maximum intensity direction at a lower rate in the red wavelength range than in the blue wavelength range. Therefore, red light contributes most to the effect of making a scratch or the like present on the film M appear less distinctly in the image shot, and blue light contributes least thereto. As a result, a scratch or the like present on the film M appears somewhat reddish in the image shot. Nevertheless, since the diffusion characteristics of the diffusive optical element 1 over the entire spectrum of white light, if set according to expressions (2) to (5), do not deviate much from perfect diffusion, the resulting change in hue is not readily noticeable.

In the embodiments described hereinbefore, light is diffused with different diffusion characteristics in three wavelength ranges. However, the number of wavelength ranges may freely be set at any number other than three, as long as it is two or more. For example, four wavelength ranges may be used by creating an intermediate wavelength range between the blue and green wavelength ranges. It is advisable to determine the number of wavelength ranges according to the intensity distribution of the light emitted from the light source actually used. With a common light source that emits white light, however, three wavelength ranges suffice to enhance light use efficiency in a wavelength range in which light intensity is low.

Moreover, in all the examples described hereinbefore, the diffusive optical element has diffusion characteristics defined by expressions (2) to (4). However, the diffusion characteristics of the diffusive optical element may be defined with other expressions as long as light is diffused in such a way that, the lower the intensity of incident light in a wavelength range, the higher the rate at which the intensity of diffused light in that wavelength range is reduced with increasing angle relative to the maximum intensity direction. For example, it is possible to use expressions similar to expressions (2) to (4) in which the intensity in the individual wavelength ranges is proportional to the cosine of the angle to the power of 1, 2, and 3 respectively, or to the power of 2, 4, and 7 respectively.

Obviously, many modifications and variations of the present invention are possible in light of the above teachings. It is therefore to be understood that within the scope of the appended claims, the invention may be practiced other than as specifically described.

What is claimed is:

1. A diffusive optical element for diffusing light,
   wherein light that includes a plurality of wavelength ranges incident thereon from a predetermined direction is diffused such that a maximum intensity of resulting diffused light in each of the plurality of wavelength ranges is exhibited in an identical maximum intensity direction, and wherein a rate for reducing an intensity of diffused light for each of the plurality of wavelength ranges, by increasing an angle relative to said maximum intensity direction, increases as an intensity of said light in the respective wavelength range which is incident from said predetermined direction decreases.

2. A diffusive optical element as claimed in claim 1, wherein the diffusive optical element has a shape of a flat plate.

3. A diffusive optical element as claimed in claim 2, wherein the maximum intensity direction is normal to an exit surface of the diffusive optical element.

4. A diffusive optical element as claimed in claim 1, wherein the diffusive optical element is an on-axis type hologram element.

5. A diffusive optical element as claimed in claim 1, wherein the diffusive optical element is an off-axis type hologram element.

6. A diffusive optical element as claimed in claim 1, wherein the diffusive optical element is a transmissive type hologram element.

7. A diffusive optical element as claimed in claim 1, wherein the diffusive optical element is a reflective type hologram element.

8. A diffusive optical element as claimed in claim 1, wherein the rate at which the intensity of the diffused light is reduced with increasing angle relative to the maximum intensity direction is set separately for light of three wavelength ranges corresponding to red, green, and blue regions of a light spectrum.

9. An illumination optical system, comprising:

a light source for radiating light of wavelengths ranging from red to blue regions of a light spectrum;

an integrator for directing the light radiated from the light source toward a predetermined illumination target plane as a light beam having a uniform intensity distribution; and a diffusive optical element for diffusing the light from the light source, wherein the light from the light source incident on the diffusive optical element from a predetermined direction is diffused such that a maximum intensity of thus diffused light in each of the wavelengths ranging from red to blue is exhibited in an identical maximum intensity direction, wherein a rate for reducing an intensity of diffused light for a wavelength range, by increasing an angle relative to said maximum intensity direction, increases as an intensity of incident light in said wavelength range decreases, wherein the rate at which the intensity of the diffused light is reduced with increasing angle relative to the maximum intensity direction is set separately for light of a plurality of different wavelength ranges, and wherein the diffusive optical element is disposed in an optical path from the integrator to the illumination target plane such that the light beam exiting from the integrator is incident on the diffusive optical element from the predetermined direction and the maximum intensity direction is perpendicular to the illumination target plane.

10. An illumination optical-system as claimed in claim 9, wherein the diffusive optical element has a shape of a flat plate.

11. An illumination optical system as claimed in claim 10, wherein the maximum intensity direction is normal to an exit surface of the diffusive optical element.

12. An illumination optical system as claimed in claim 9, wherein the diffusive optical element is an on-axis type hologram element.

13. An illumination optical system as claimed in claim 9, wherein the diffusive optical element is an off-axis type hologram element.

14. An illumination optical system as claimed in claim 9, wherein the diffusive optical element is a transmissive type hologram element.

15. An illumination optical system as claimed in claim 9, wherein the diffusive optical element is a reflective type hologram element.

16. An illumination optical system as claimed in claim 9, wherein the rate at which the intensity of the diffused light is reduced with increasing angle relative to the maximum intensity direction is set separately for light of three wavelength ranges corresponding to red, green, and blue regions of a light spectrum.

17. An image-shooting apparatus, comprising:

a light source for radiating light of wavelengths ranging from red to blue regions of a light spectrum;

an integrator for directing the light radiated from the light source toward a predetermined illumination target plane as a light beam having a uniform intensity distribution;

a diffusive optical element for diffusing the light from the light source, wherein the light from the light source incident on the diffusive optical element from a predetermined direction is diffused such that a maximum intensity of thus diffused light in each of the wavelengths ranging from red to blue is exhibited in an identical maximum intensity direction, wherein a rate for reducing an intensity of diffused light for a wavelength range, by increasing an angle relative to said maximum intensity direction, increases as an intensity of incident light in said wavelength range decreases, wherein the rate at which the intensity of the diffused light is reduced with increasing angle relative to the maximum intensity direction is set separately for light of a plurality of different wavelength ranges, and wherein the diffusive optical element is disposed in an optical path from the integrator to the illumination target plane such that the light beam exiting from the integrator is incident on the diffusive optical element from the predetermined direction and the maximum intensity direction is perpendicular to the illumination target plane;

a taking lens for imaging the light beam exiting from the diffusive optical element and transmitted through a subject placed on the illumination target plane onto a predetermined imaging plane, the taking lens having an optical axis normal to the illumination target plane;

an image-sensing device, disposed on the imaging plane, for shooting the subject by receiving the light beam exiting from the taking lens; and a light adjuster for adjusting a brightness of light differently in different wavelength ranges based on the rates at which the intensity of the diffused light is reduced with increasing angle relative to the maximum brightness direction in the individual wavelength ranges and based on an entrance-side numerical aperture of the taking lens in such a way that the image-sensing device receives light having substantially identical power in the plurality of wavelength ranges.

18. An image-shooting apparatus as claimed in claim 17, wherein the diffusive optical element has a shape of a flat plate and is arranged parallel to the illumination target plane, and wherein, let a distance from the diffusive optical element to the illumination target plane be L, let an effective diameter of the subject be $D_F$, and let the entrance-side numerical aperture of the taking lens be $\sin(\theta_{NA})$, then the following relation is fulfilled:

$$1/[2\tan(\theta_{NA})] \leq L \leq D_F/[2\tan(2\theta_{NA})].$$

19. A structure suitable for use as an optical diffuser, the structure comprising:

a light receiving surface;

a light emitting surface;

a first hologram layer for diffusing light in a first wavelength range; and a second hologram layer for diffusing light in a second wavelength range, wherein a maximum intensity of diffused light, including light in the first and second wavelength ranges, is emitted from the light emitting surface in a maximum intensity direction whenever light, including light in the first and second wavelength ranges, is incident on the light receiving surface from a predetermined direction, wherein the first hologram layer diffuses light in the first wavelength range such that, as an intensity of light in the first wavelength range received by the first hologram layer decreases, an intensity of light in the first wavelength range diffused by the first hologram layer is reduced with increasing angle relative to said maximum intensity direction at a first rate, and wherein the second hologram layer diffuses light in the second wavelength range such that, as an intensity of light in the second wavelength range received by the second hologram layer decreases, an intensity of light in the second wavelength range diffused by the second hologram layer is reduced with increasing angle relative to said maximum intensity direction at a second rate.

20. A structure as claimed in claim 19, wherein the first wavelength range includes wavelengths that are longer than any wavelengths included in the second wavelength range, and wherein said first rate is lower than said second rate.

21. A structure as claimed in claim 19, further comprising:

a transparent substrate having an upper surface and a lower surface; and a third hologram layer for diffusing light in a third wavelength range, wherein the light receiving surface is the lower surface of the transparent substrate, wherein the third hologram layer diffuses light in the third wavelength range such that, as an intensity of light in the third wavelength range received by the third hologram layer decreases, an intensity of light in the third wavelength range diffused by the third hologram layer is reduced with increasing angle relative to said maximum intensity direction at a third rate.

22. A structure as claimed in claim 21, wherein the first wavelength range includes wavelengths that are longer than any wavelengths included in either of the second wavelength range and the third wavelength range, wherein the second wavelength range includes wavelengths that are longer than any wavelengths included in the third wavelength range, wherein said first rate is lower than said second rate, and wherein said second rate is lower than said third rate.

23. A structure as claimed in claim 22, wherein the third hologram layer is positioned between the second hologram layer and the upper surface of the transparent substrate, wherein the first hologram layer has an upper hologram surface and a lower hologram surface, wherein the second hologram layer is positioned between the third hologram layer and the lower hologram surface of the first hologram layer, wherein the light emitting surface is the upper hologram surface of the first hologram layer, and wherein said maximum intensity direction is normal to the light emitting surface.

* * * * *

UNITED STATES PATENT AND TRADEMARK OFFICE
CERTIFICATE OF CORRECTION

PATENT NO. : 6,515,775 B2  
DATED : February 4, 2003  
INVENTOR(S) : Yuichiro Ori It is certified that error appears in the above-identified patent and that said Letters Patent is hereby corrected as shown below:

Column 9,  
Line 67, Equation 13, delete "$E_B=2\pi I_B(0) [1-\cos^7(\theta_{NA})]/4$", and insert -- $E_B=2\pi L_B(0) [1-\cos^7(\theta_{NA})]/4$ --.

Column 11,  
Line 33, Equation 16, delete "$\theta_{max} 24\ \theta_{NA}$", and insert -- $\theta_{max} \geq 2\theta_{NA}$ --.

Column 12,  
Line 11, delete "$D_B=36$", and insert -- $D_D=36$ --.

Signed and Sealed this

Twenty-fourth Day of February, 2004

JON W. DUDAS  
*Director of the United States Patent and Trademark Office*